(12) United States Patent
Curts

(10) Patent No.: US 9,281,667 B2
(45) Date of Patent: Mar. 8, 2016

(54) BACK SAVER (A-FRAME PULLY SYSTEM)

(71) Applicant: Randall Wayne Curts, Iowa Park, TX (US)

(72) Inventor: Randall Wayne Curts, Iowa Park, TX (US)

( * ) Notice: Subject to any disclaimer, the term of this patent is extended or adjusted under 35 U.S.C. 154(b) by 0 days.

(21) Appl. No.: 13/839,434

(22) Filed: Jul. 2, 2013

(65) Prior Publication Data

US 2013/0320280 A1 Dec. 5, 2013

Related U.S. Application Data

(60) Provisional application No. 61/687,850, filed on May 3, 2012.

(51) Int. Cl.
*H02G 1/08* (2006.01)
*H02G 1/06* (2006.01)

(52) U.S. Cl.
CPC ...................................... *H02G 1/06* (2013.01)

(58) Field of Classification Search
CPC ............ H02G 1/02; H02G 1/04; H02G 1/06; H02G 1/081
USPC .................. 254/134.3 R, 213, 214, 299, 300, 254/134.3 PA, 222, 225, 226, 334, 335; 242/564.4, 566; 212/239, 241
See application file for complete search history.

(56) References Cited

U.S. PATENT DOCUMENTS

| | | | | |
|---|---|---|---|---|
| 58,235 A * | 9/1866 | English | ...................... | 52/651.05 |
| 987,455 A * | 3/1911 | Fischer | ......................... | 212/241 |
| 1,461,650 A * | 7/1923 | Falzer et al. | .................. | 254/334 |
| 2,655,653 A * | 10/1953 | Chauvin | ............. | 254/134.3 FT |
| 2,710,273 A * | 6/1955 | Hollingsworth | ................ | 29/434 |
| D181,438 S * | 11/1957 | Peterson | ......................... | D12/1 |
| 3,072,382 A * | 1/1963 | Jones | ................... | 254/134.3 FT |
| 3,072,383 A * | 1/1963 | Vanderhagen | ....... | 254/134.3 FT |
| 3,317,149 A * | 5/1967 | Gooch | ........................ | 242/564.4 |
| 3,458,152 A * | 7/1969 | Barkley et al. | ............. | 242/422.4 |
| 4,447,013 A * | 5/1984 | Sandered et al. | ...... | 254/134.3 R |
| 4,782,962 A * | 11/1988 | Hackworth et al. | .......... | 212/195 |
| 5,156,355 A * | 10/1992 | Wadle | .......................... | 242/470 |
| 5,595,355 A * | 1/1997 | Haines | .......................... | 242/470 |
| 7,832,709 B2 * | 11/2010 | O'Connor | ............. | 254/134.3 R |
| 8,434,741 B2 * | 5/2013 | Radle et al. | .......... | 254/134.3 FT |

* cited by examiner

*Primary Examiner* — William Gilbert

(57) ABSTRACT

A wire feeding pulley A-Frame System is provided for feeding electrical, telephone, communication wires ect into manhole, transformers, switch gears ect., including a frame having four vertical rails one horizontal rail at the top which has four short pieces of square tubing welded to it which the vertical rails sleeve over and are held together by horizontal pins. The bottom of the frame has four horizontal pieces welded into a square that have four short vertical pieces welded on top of them that the vertical rails can sleeve into and be held together by horizontal pins. It has three vertical pieces of square tubing welded to the bottom side of the top horizontal rail that three pulleys can be attached to for wire to be fed through. There is also a square tube that can be attached to the bottom frame that has a smaller square tube inside of it that has a pulley that pins on the end of it, making it a snorkel attachment for feeding into devices with small doorways.

1 Claim, 23 Drawing Sheets

BACK SAVER (A-FRAME PULLY SYSTEM)

BACKGROUND OF THE INVENTION

It is often required to feed electrical, telephone wires ect. Into manholes and switches. There are numerous designs of pulleys and wire feeding systems that are made to protect wires once they have entered manholes. However, currently the devices for feeding them from above ground before and while they enter the manhole still allow wires to tangle or be damaged and require a lot of human handling of the wires themselves to keep them in the right order for proper feeding.

SUMMARY OF THE INVENTION

It is the intent of the invention to address the aforementioned issues.

In one aspect of the invention, an A-Frame pulley system assembly for feeding wire is provided where the A-Frame has at least 2 pairs of upright side rails. The A-Frame assembly includes two u-shaped frame pieces that are connected to make a square shaped base. The U-shaped frame pieces each have a pair of short rails and a elongated center rail connecting to each end of the side rails. The side rails are connected to each other by a pair of connecting links in the that are sleeved into each open end of the u shaped frame pieces attaching them together making the pair of u-shaped frame pieces into a square base. The two pairs of upright side rails are sleeved down into the brackets that are welded on top of the corners of the u-shape frame pieces. The two pairs of upright side rails have open square ends on the top of each one of them that the top horizontal rail of the A-frame can be attached to by four smaller square tubing pieces that are welded to the bottom of the top horizontal rail being sleeved down inside of the end of the two pairs of upright side rails completing the A-frame shape. The top horizontal rail has three square tubing pieces that are welded to the bottom of the beam for pulleys to be attached to for wire feeding. The top horizontal rail also has a bracket welded to the side for a pulley to be placed for retrieving workers out of manholes with a retrieval system hoist.

ADVANTAGES

The A-Frame Pulley System allows you to feed wire into a manhole off of three reels at once without anyone having to turn the reels by hand or anyone having to stand over a manhole and feed the wire over their shoulder. The advantage of having three separate pulleys at different heights is that your wire will not be able to twist around each other and the wire will not get damaged while it is being fed into the hole.

DETAILED DESCRIPTION OF THE PREFERRED EMBODIMENT

Figure 1:
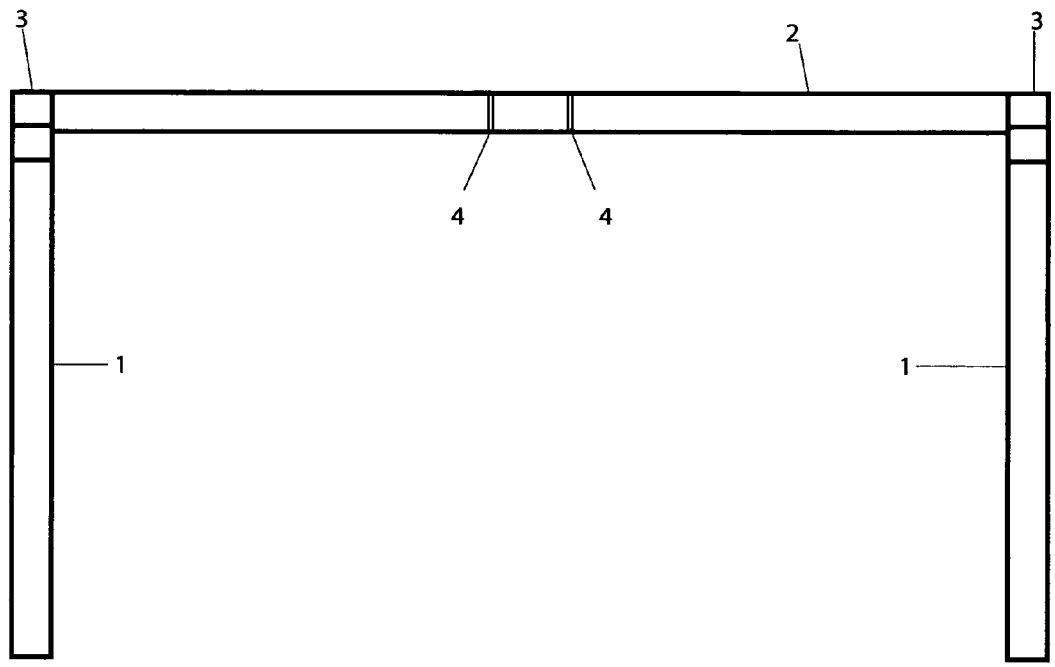
FIG. 1—is a top view of an open rectangular frame for the A-Frame Pulley System according to the present invention.
Figure 1A:
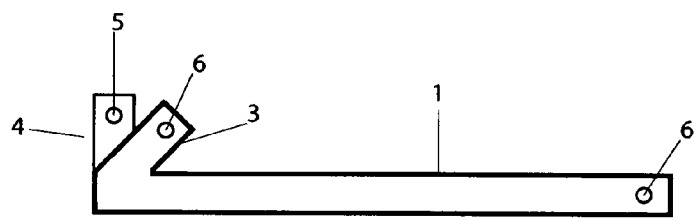
FIG. 1A—is a schematic of a side view of the open rectangular frame showing where the upright side rails connect, and the snorkel attaches.
Figure 1B:
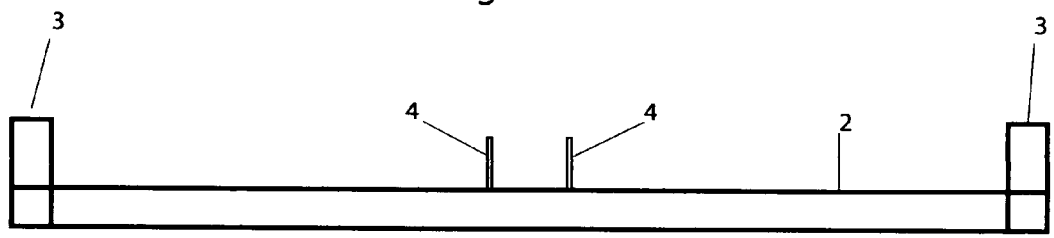
FIG. 1B—is a front view of the open rectangular frame. Showing where the upright side rail connect and snorkel attaches.

Looking at FIG. 1-20, the invention of a A-frame pulley system an open rectangular frame. FIG. 1, having a pair of side rails 1 and the front rail 2. The side rails 1 are welded to the front rail 2. There is the square tubing bracket 3 welded on the top of the point where the side rails 1 are welded to the front rail 2. The square tubing bracket 3 has the hole 6 where the upright side rail 22 will sleeve inside of the bracket 3 and they are attached by the spring loaded pin 38 passing through the hole 6. The side rails 1 are connected to the side rails 24 by the connecting links 27 and are attached by a spring loaded pin 38 passing through the hole 6.

FIG. 1 A shows a side view of the side rail 1 and makes it possible to see where the side rails 22 sleeve inside the bracket 3 and will connect with the spring loaded pin 38 through hole 6 in the bracket 3 and the upright side rail 22. FIG. 1 A shows a side view of a bracket 4 that shows where the snorkel 14 attaches with the large pin 39 which fits through hole 5.

FIG. 1 B shows a front view of the front rail 2 and square tubing brackets 3 which upright side rails 22 sleeve inside of and snorkel attachment brackets 4 welded on top of front rail 2.

Figure 2:
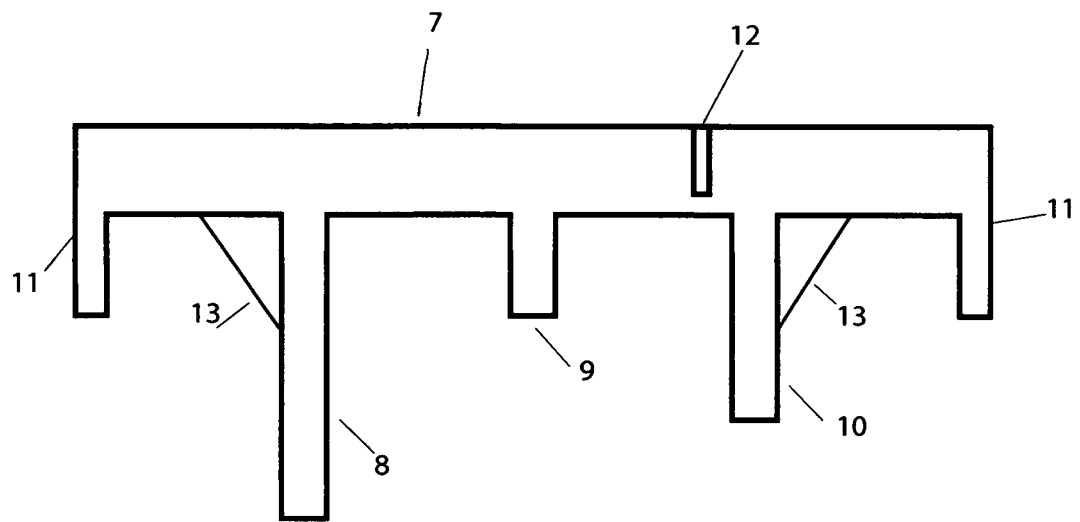
FIG. 2—is a front view of the top horizontal rail showing where upright side rails and pulleys attach FIG. 2A—is a side view showing where upright side rails and pulleys attach.
Figure 2A:
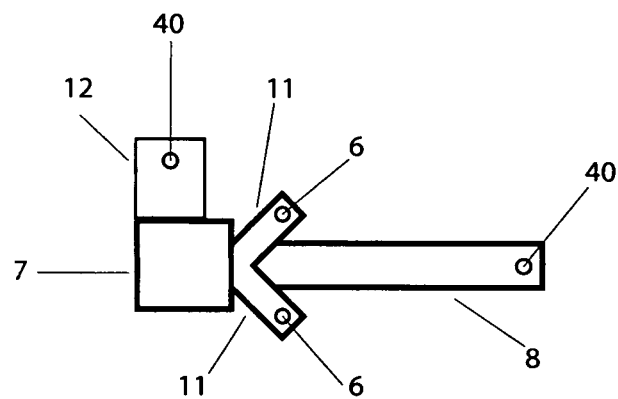

FIG. 2 is showing a front view of the top horizontal rail 7. Square tubing pieces 8, 9, and 10 are welded to the top horizontal rail 7 and square tubing pieces 8 and 10 have a gusset 13 welded to them and top horizontal rail 7 for strength because of there length. The middle square tubing piece 9 is welded to top horizontal rail 7 and square tubing piece 9 doesn't need a gusset 13 because square tubing piece 9 is shorter than square tubing pieces 8 and 10. Square tubing pieces 8, 9 and 10 are what feeding pulleys can be attached to for feeding wire through. Smaller square tubing pieces 11 are welded to top horizontal rail 7 for upright side rails 19, 20 and 22 to sleeve over and are attached by the spring loaded pin 38 being passed through the hole 6. The bracket 12 is welded on the front side of the top horizontal rail 7 and is made for a retrieval system pulley to be attached.

FIG. 2 A is showing a side view of top horizontal rail 7. Square tubing piece 8 is shown from the side and the hole 40 is shown for the pin 35 to pass through which will hold bracket 36 and the shackle 37 will attach to the bottom end of bracket 36 so a feeding pulley can be attached to the shackle 37. Smaller square tubing pieces 11 are shown from a side view which upright side rail 19, 20 and 22 will sleeve over and spring loaded pins 38 will pass through holes 6 attaching upright side rails 19, 20 and 22. Bracket 12 is shown from the side and has the hole 40 which pin 35 will pass through attaching a retrieval pulley.

Figure 3:
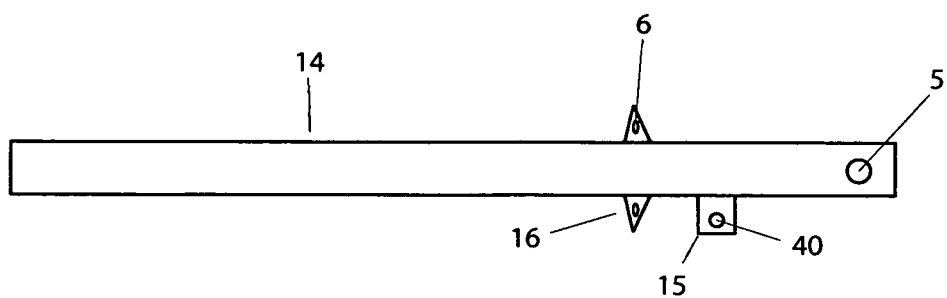
FIG. 3—is a top view of snorkel showing where brace rails and lift jack attach and snorkel extension attaches.
Figure 3A:
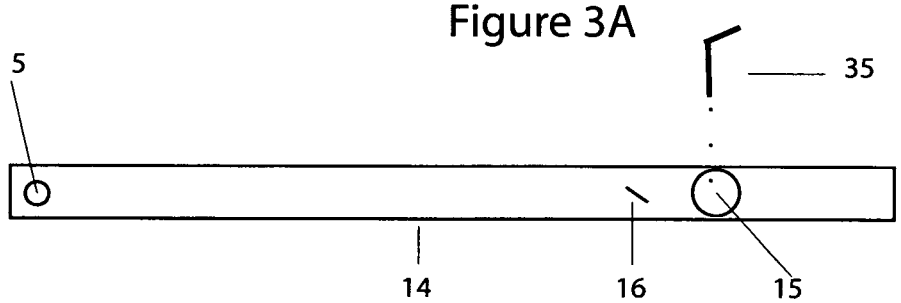
FIG. 3A—is a side view of snorkel showing where the brace rails and lift jacks attach to snorkel, and showing where the snorkel attaches to the rectangular frame.
Figure 3B:
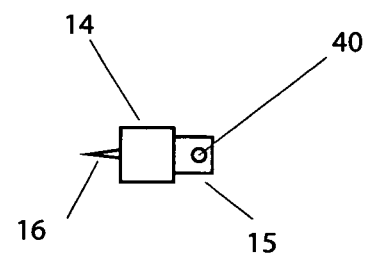
FIG. 3B—is a end view of snorkel.

FIG. 3 is showing a top view of the snorkel 14 showing the hole 5 which the pin 39 passes through and attaches snorkel extension 17 to snorkel 14 by pin 39 passing through the hole 5. Triangle brackets 16 are mirror images and are welded to the sides of snorkel 14. Triangle brackets 16 are the point where brace rail extensions 28 are attached by passing spring loaded pins 38 through hole 6. Cylindrical bracket 15 is welded to the side of snorkel 14 and has a hole 40 which the pin 35 passes through attaching a lift jack 30 to the side of the snorkel 14. The cylindrical bracket 15 sleeves over the cylindrical bracket 31 and they are attached by the pin 35.

FIG. 3 A shows a side view of the snorkel 14. The hole 5 is shown which the pin 39 passes through attaching snorkel 14 to brackets 4 which are welded on top of front rail 2. One triangular bracket 16 is shown welded on the side of snorkel 14 which brace rail extension 28 is attached to. Cylindrical bracket 15 is shown welded to the side of snorkel 14 and lift jack 30 is pinned to cylindrical bracket is with the pin 35 passing through the hole 40.

FIG. 3 B Shows a end view of snorkel 14. Triangular bracket 16 is shown welded to the side of snorkel 14 which brace rail extension 28 is attached to. Cylindrical bracket 15 is shown welded to the side of snorkel 14 and has a hole 40 which the pin 35 passes through and attaches lift jack cylindrical bracket 31 to cylindrical bracket 15 attaching lift jack 30 to snorkel 14.

Figure 4:
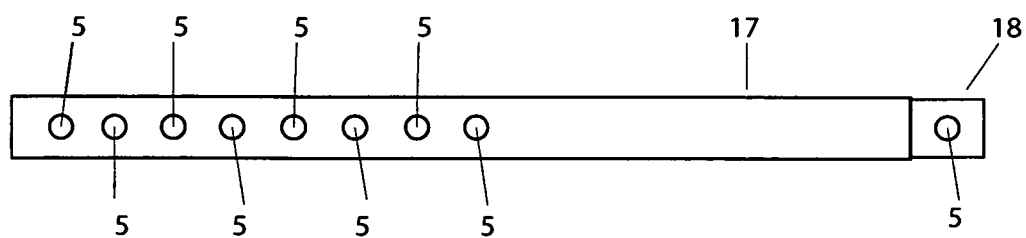
FIG. 4—is a top view of snorkel extension showing where it attaches to snorkel and where tip pulley attaches to extension.
Figure 4A:
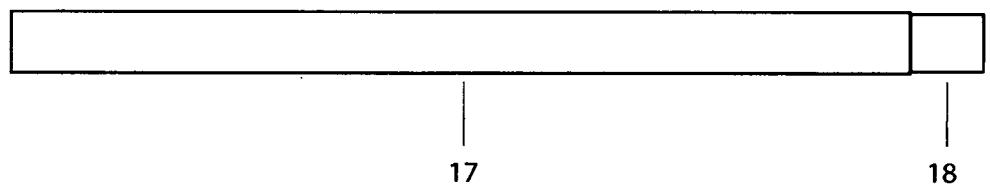
FIG. 4A—is a side view of the snorkel extension is showing where tip pulley attaches to the extension.

FIG. 4 is showing a top view of snorkel extension 17. The cylindrical bracket 18 is shown welded to the end of snorkel extension 17. It sleeves inside of tip pulley bracket 32 and is attached by the pin 39 passing through the hole 35. There are also 8 holes 5 that are on the opposite end of the snorkel extension 17 which the pin 39 passes through attaching snorkel extension 17 to snorkel 14.

FIG. 4 A shows a side view snorkel extension 17. Cylindrical bracket 18 is shown welded to the end of snorkel extension 17.

Figure 5:
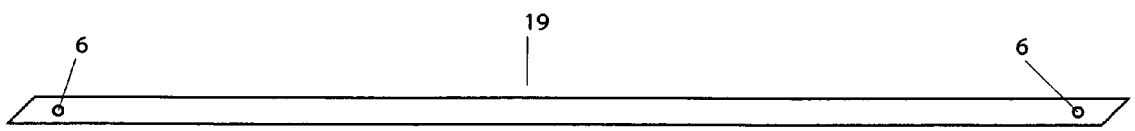
FIG. 5—is showing a side view of a up right side rail.
Figure 5A:
FIG. 5A—is showing a end view of the side rail.

FIG. 5 is showing a side view of the upright side rail 19. The hole 6 is shown on each end of the upright side rail 19. One end of upright side rail 19 is the point where it attaches to the vertical bracket 3. The upright side rail 19 sleeves down inside of the bracket 3 and they are attached by the pin 38 passing through the hole 6. The opposite end of upright side rail 19 is the point where it attaches to the bracket 11 by being sleeved over the bracket 11 and they are attached by the pin 38 passing through the hole 6.

FIG. 5 A is showing the end view of upright side rail 19.

Figure 6:
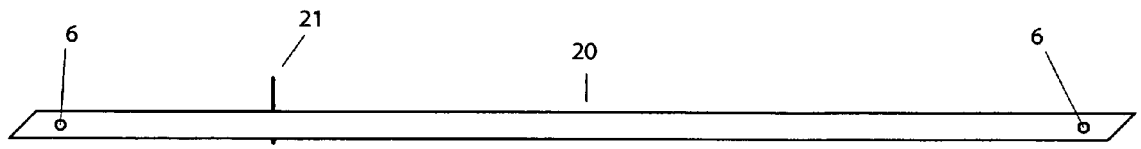
FIG. 6—is showing a side view of a upright side rail with a eye nut attached.

FIG. 6 is showing a side view of the upright side rail 20. The hole 6 is shown on each end of upright side rail 20. One end of upright side rail 20 is the point where it attaches to the vertical bracket 3. The upright side rail 20 sleeves down inside of the bracket 3 and they are attached by the pin 38 being passed through the hole 6.

Figure 6A:
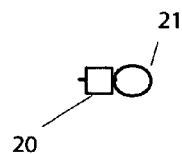
FIG. 6A—is showing a end view of a upright side rail with eye nut attached.

FIG. 6A is showing end view of upright side rail 20. A eye bolt 21 is shown passing through upright side rail 20. Eye bolt 21 is attached to upright side rail 20 for the cable from a retrieval system to be hooked onto to keep it in the clear while electrical cables are being pulled.

Figure 7:
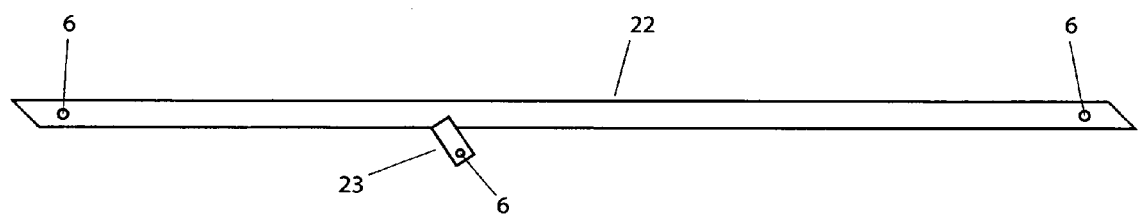
FIG. 7—is showing the end view of the upright side rail, and is showing a bracket where a brace rail attaches and is on one side of the apparatus.

FIG. 7 is showing a side view of the upright side rail 22. Hole 6 is shown on each end of the upright side rail 22. One end of the upright side rail 22 attaches to the vertical bracket 3. The upright side rail 22 sleeves down inside of the bracket 3 and they are attached by the pin 38 passing through the hole 6. Bracket 23 is shown welded to the side of upright side rail 22. Bracket 23 attaches brace rail 26 to upright side rail 22.

Figure 7A:
FIG. 7A—is showing the end view of the upright side rail, and is showing a bracket where a brace rail attaches.

FIG. 7A is showing a end view of the upright side rail 22. The brackets 23 are shown welded to the side of the upright side rail 22. The brackets 23 are shown as mirror images.

Figure 8:
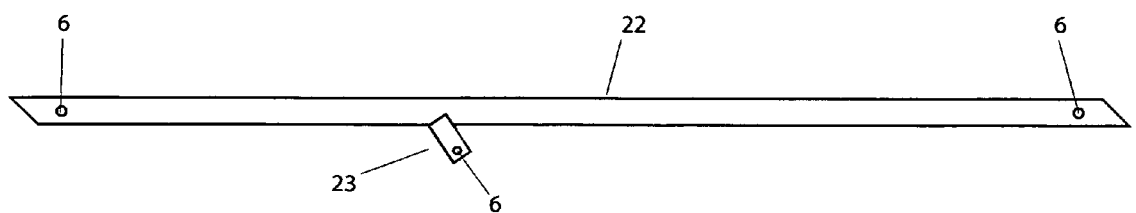
FIG. 8—is showing a side view of the upright side rail, and is showing a bracket where a brace attaches and is on the opposite side of the apparatus to FIG. 7.

FIG. 8 is showing a side view of the other upright side rail 22. Everything shown on FIG. 7 and FIG. 8 are exactly the same because FIG. 7 and FIG. 8 are opposite sides of the apparatus.

Figure 8A:
FIG. 8A—is showing the end view of the upright side rail, and is showing a bracket where a brace rail attaches.

FIG. 8A is showing a end view of the other upright side rail 22. Everything shown on FIG. 7A and FIG. 8A are exactly the same because FIG. 7A and FIG. 8A are opposite sides of the apparatus.

Figure 9:
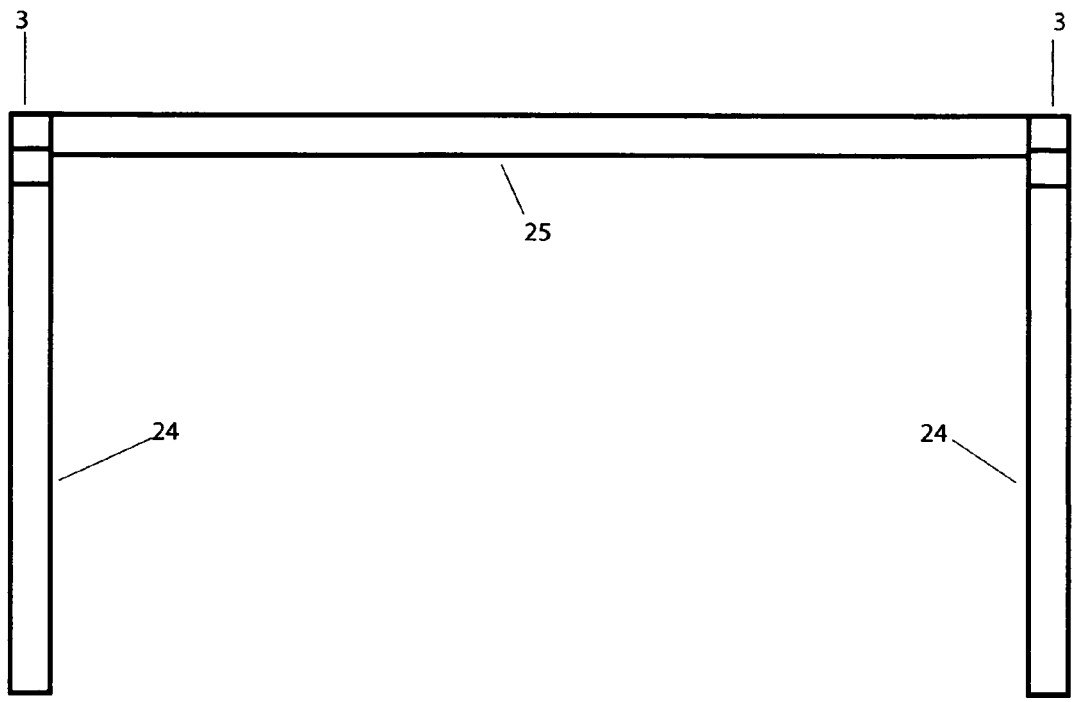
FIG. 9—is a top view of an open rectangular frame for the A—Frame Pulley System according to the present invention.

FIG. 9 is showing an open rectangular frame having a pair of side rails 24 and front rail 25. The side rails 24 are welded to the front rail 25. There is a square tubing bracket 3 welded on top of the point where side rails 24 are welded to the front rail 25. The square tubing bracket 3 has the hole 6 where the upright side rails 19 and 20 will sleeve inside of the bracket 3 and they are attached by spring-loaded pin 38 being passed through the hole 6. Side rails 24 are connected to the side rails 1 by the connecting links 27 and are attached by the spring-loaded pin 38 being passed through the hole 6.

Figure 9A:
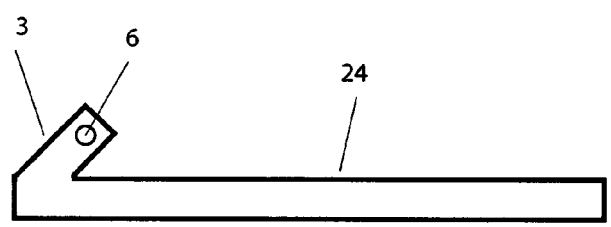
FIG. 9A—is a schematic of a side view of the open rectangular frame showing where the upright side rails connect.

FIG. 9A shows a side view of the side rail 24 and makes it possible to see the point where the upright side rail 20 sleeves inside of the bracket 3 and will connect with spring loaded pin 38 being passed through the hole 6.

Figure 9B:
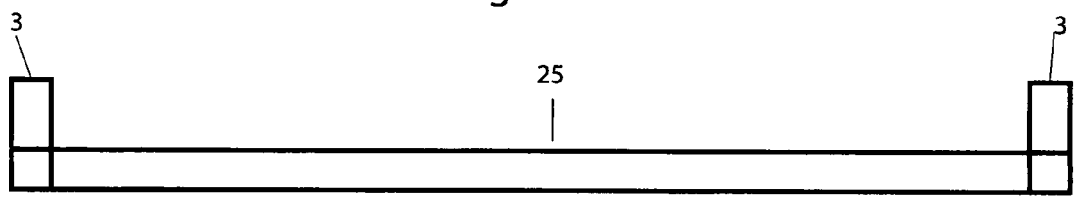
FIG. 9B—is a front view of the open rectangular frame showing where the uprights connect.

FIG. 9B shows a front view of front rail 25 and square tubing brackets 3 which upright side rails 19 and 20 sleeve inside of.

Figure 10:
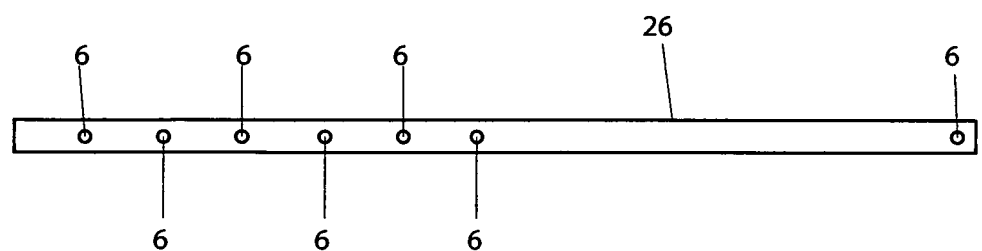
FIG. 10—is showing a top view of a brace rail showing where it attaches to upright side rail bracket and brace rail extension and is on one side of the apparatus.

FIG. 10 is showing a top view of brace rail 26. There are 6 holes on one end of brace rail 26 and they are the point where the brace rail 26 attaches to the brace rail extension 28 by brace rail 26 being sleeved over brace rail extension 28 and the pin 38 being passed through the hole 6. The other end of brace rail 26 has one hole 6 that is the point where it attaches to the brackets 23 by the pin 38 being passed through the hole 6.

Figure 10A:
FIG. 10A—is showing an end view of the brace rail.

FIG. 10A is showing a end view of brace rail 26.

Figure 10B:
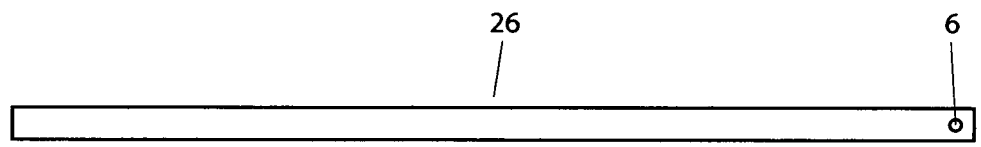
FIG. 10B—is a side view of the brace rail, and is showing where it attaches to the upright side rail bracket.

FIG. 10B is showing a side view of brace rail 26 with the hole 6 on one end.

Figure 11:
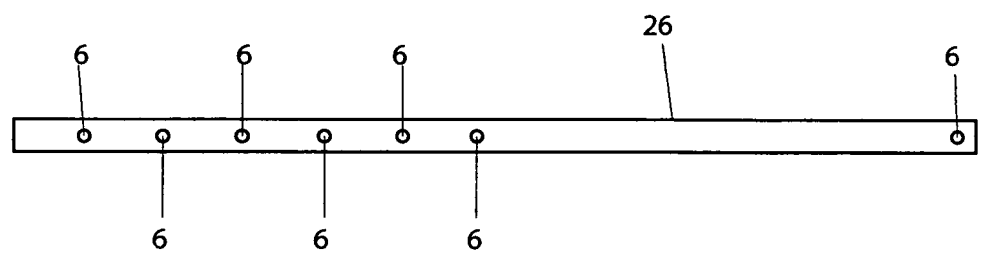
FIG. 11—is showing a top view of a brace rail showing where it attaches to upright side rail bracket and brace rail extension and is on the opposite side of the apparatus to FIG. 10.

FIG. 11 is showing a top view of the other brace rail 26. Everything shown on FIG. 10 and FIG. 11 are exactly the same because FIG. 10 and FIG. 11 are opposite sides of the apparatus.

Figure 11A:
FIG. 11A—is showing an end view of the brace rail.

FIG. 11A is showing the end of the other brace rail 26. Everything shown on FIG. 10A and FIG. 11A are exactly the same because FIG. 10A and FIG. 11A are opposite sides of the apparatus.

Figure 11B:
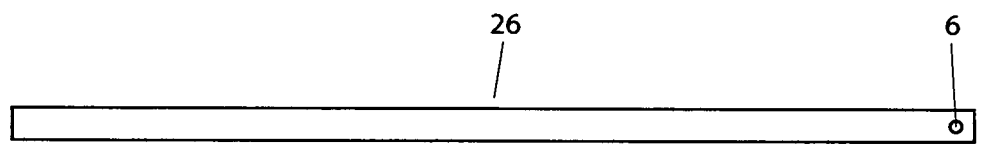
FIG. 11B—is showing a side view of the brace rail, and is showing where it attaches to the upright side rail bracket.

FIG. 11B is showing a side view of the other brace rail 26 with the hole 6 on one end. FIG. 11A and FIG. 11B are exactly the same because FIG. 11A and FIG. 11B are opposite sides of the apparatus.

Figure 12:
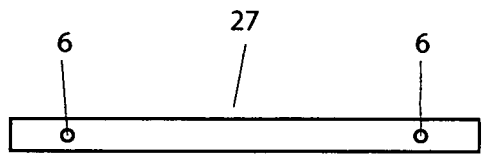
FIG. 12—is showing a side view of the connecting link that attaches the rectangular frames together and is on the opposite side of the apparatus to FIG. 14.

FIG. 12 is showing a side view of connecting link 27. There is the hole 6 on each end of the connecting link 27. One end of connecting link 27 is the point where connecting link 27 is attached to the side rail 1 by the pin 38 being passed through the hole 6. The other end of connecting link 27 is the point where connecting link 27 is attached to the side rail 24 by pin 38 being passed through the hole 6.

Figure 12A:
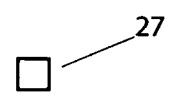
FIG. 12A—is the end view of the connecting link that attaches the rectangular frames together.

FIG. 12A is showing a end view of connecting link 27.

Figure 13:
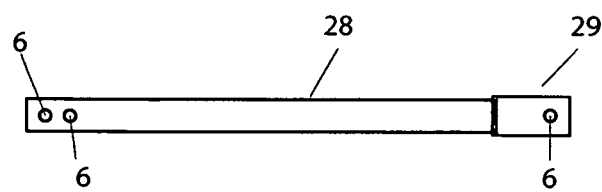
FIG. 13—is showing a top view of the brace rail extension where it attaches to the brace rail and snorkel and is on the opposite side of the apparatus to FIG. 15.

FIG. 13 is showing a top view of a brace rail extension 28. There is a bracket 29 welded on one end of the brace rail extension 28. The bracket 29 has the hole 6, which is the point where the bracket 29 attaches to the triangular bracket 16 by the pin 38 being passed through the hole 6. The brace rail extension 28 sleeves inside of the brace rail 26 and the brace rail extension 28 has two holes 6 at the opposite end and that is the point where the brace rail 26 and the brace rail extension 28 are attached by a pin 38 being passed through hole 6.

Figure 13A:
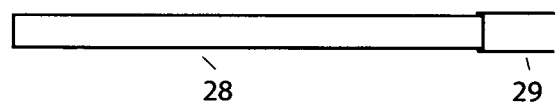
FIG. 13A—is showing a side view of the brace rail extension.

FIG. 13A is showing a side view of brace rail extension 28. Brackets 29 are shown welded to one end of brace rail extension 28.

Figure 14:
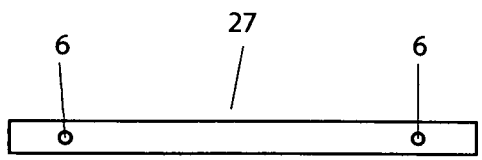
FIG. 14—is showing a side view of the connecting link that attaches the rectangular frames together and is on one side of the apparatus.

FIG. 14 is showing a side view of the other connecting link 27. There is a hole 6 on each end of the connecting link 27. One of the connecting link 27 is the point where connecting link 27 is attached to the side rail 1 by the pin 38 being passed through the hole 6. The other end of the connecting link 27 is the point where connecting link 27 is attached to the side rail 24 by the pin 38 being passed through the hole 6.

Figure 14A:
FIG. 14A—is the end view of the connecting link that attaches the rectangular frames together.

FIG. 14A is showing a end view of connecting link 27.

Figure 15:
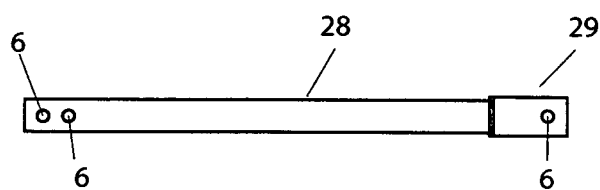
FIG. 15—is showing a top view of the brace rail extension where it attaches to the brace rail and snorkel and is on one side of the apparatus.

FIG. 15 is showing a top view of the other brace rail extension 28. Everything shown on FIG. 13 and FIG. 15 are exactly the same because FIG. 13 and FIG. 15 are opposite sides of the apparatus.

Figure 15A:
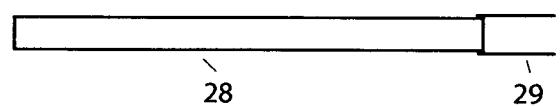
FIG. 15A—is showing a side view of the brace rail extension.

FIG. 15A is showing a side view of the other brace rail extension 28. FIG. 13A and FIG. 15A are exactly the same because FIG. 13A and FIG. 15A are opposite sides of the apparatus.

Figure 16:
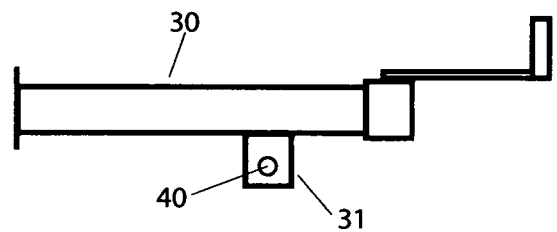
FIG. 16—is a side view of the lift jack showing where it attaches to the snorkel.

FIG. 16 is showing a end view of the lift jack 30. There is the cylindrical bracket 31 that sleeves inside of the cylindrical bracket 15 and cylindrical bracket 31 is attached to cylindrical bracket 15 by the pin 35 passing through a hole 40.

Figure 16A:
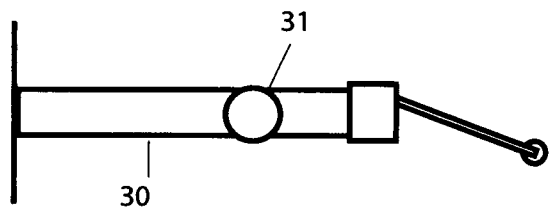
FIG. 16A—is a side view of the lift jack

FIG. 16A is showing a side view of the lift jack 30. There is a cylindrical bracket 31 that is shown welded to the side of the lift jack 30.

Figure 17:
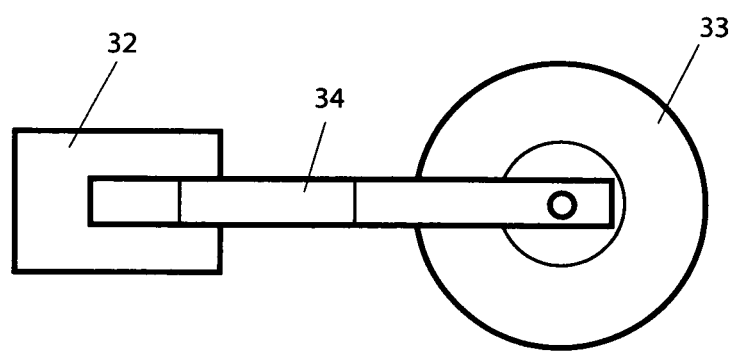
FIG. 17—is a side view of the tip pulley showing where it attaches to the snorkel extension.

FIG. 17 is showing a side view of the tip pulley 33. There is the cylindrical bracket 32 that is welded to the pulley frame 34. The cylindrical bracket 32 attaches the tip pulley 33 to the cylindrical bracket 18 that is welded to the snorkel extension 17. The cylindrical bracket 32 and the cylindrical bracket 18 are attached by the pin 39 being passed through hole 5. There is the tip pulley frame 34 welded to the cylindrical bracket 32 on one end and is attached to the pulley 33 on the other end.

Figure 17A:
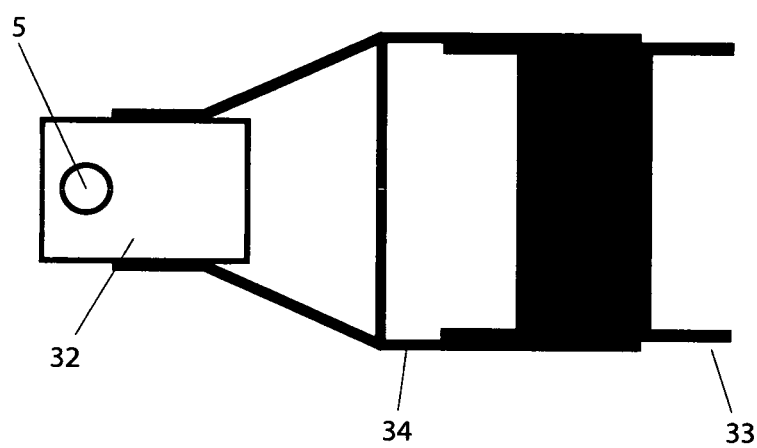
FIG. 17A—is a top view of the tip pulley showing where it attaches to the snorkel extension.

FIG. 17A shows a top view of the tip pulley.

Figure 18:
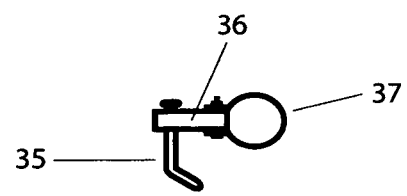
FIG. 18—are side views of connecting pins and shackles that attach pulleys to the top horizontal rail.

FIG. 18 is showing a front view of pin 35 rectangular link and shackle 37. Rectangular link 36 sleeves inside of square tubing pieces 8,9 and 10 by pin 35 passing through hole 40. The shackle 37 attaches the other end of the rectangular link 36 and a pulley can be attached to the shackle 37 with a hook. The pulley will hang from the shackle vertically for feeding electrical wires through.

Figure 19:
FIG. 19—is showing a front view of connecting pins that attach upright side rails to the rectangular frame, upright side rails to top horizontal rail, connecting links to rectangular frame, brace rails to up right side rails brackets, brace rails to brace rail extensions, brace rail extensions to snorkel.

FIG. 19 is showing a top view of the spring-loaded pin 38. Spring loaded pin 38 holds upright side rails 19, 20 and 22 to top horizontal rail 7 by pin 38 being passed through hole 6 through the top of the upright side rails 19, 20 and 22 attaching them to brackets 11. The spring-loaded pin 38 also holds the bottom end of the upright side rails 19, 20 and 22 to brackets 3 by passing through hole 6. The spring-loaded pin 38 also holds connecting links 27 to side rails 1 and side rails 24. They also hold brace rails 26 to brackets 23 and brace rails 26 to brace rail extension 28 to triangular brackets 16.

Figure 20:
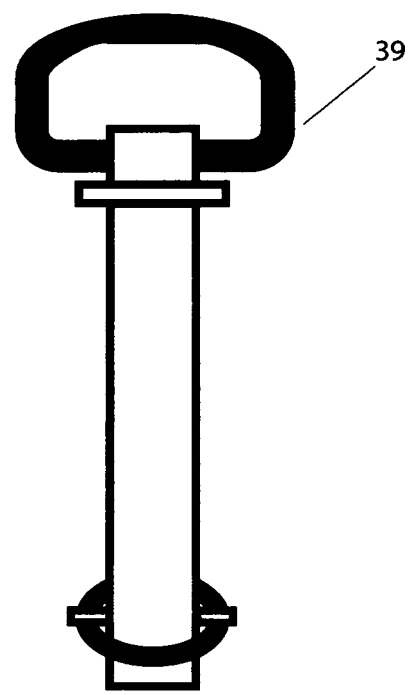
FIG. 20—is showing a front view of connecting pins that attach snorkel to rectangular frame, snorkel extension to snorkel, and tip pulley to snorkel extension.

FIG. 20 is showing a top view of connecting pin 39. Connecting pin 39 attach snorkel 14 to brackets 4 by being passed through the hole 5. Connecting pin 39 also attaches snorkel 14 to snorkel extension 17 by pin 39 being passed through the hole 5. Connecting pin 39 also attaches snorkel extension cylindrical bracket 18 to tip pulley cylindrical bracket 32 by the pin 39 being passed through the hole 5.

Figure 21:
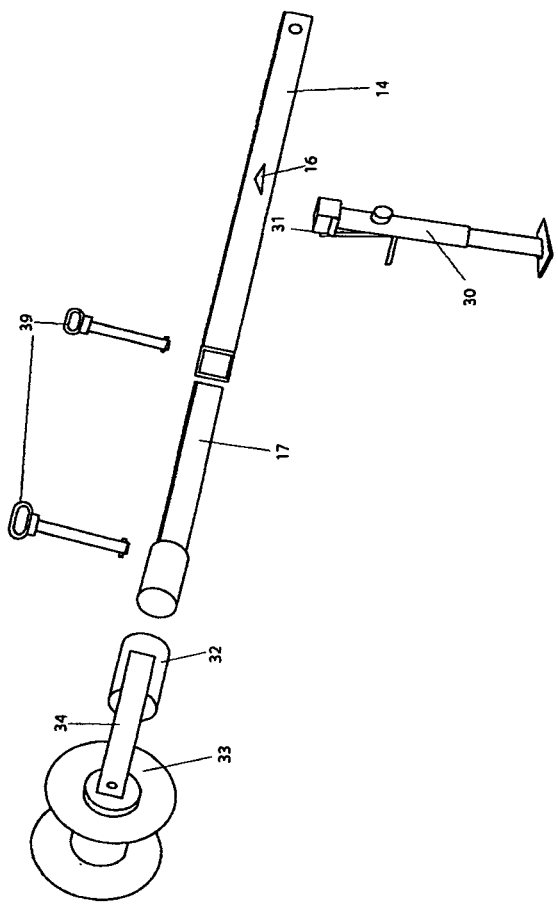
FIG. 21—is showing a side view of the snorkel assembly in an exploded view. It is showing the first section of the snorkel 14. The snorkel extension 17. All three parts of the tip pulley 32, 33, and 34. The lift jack 30 is shown and the bracket 31 is shown on the side of the lift jacket 30. Two pins 39 are also shown.

FIG. 21—is showing a exploded side view of the snorkel assembly. There are 6 parts total that are shown which come together to make the complete snorkel assembly. The snorkel extension 17 sleeves down inside of the first section of the snorkel 14 and are attached by the pin 39. The tip pulley has three parts 32, 33, and 34. The tip pulley sleeves over the snorkel extension 17 and are attached by the pin 39 The lift jack 30 attaches to the first section of the snorkel 14 to raise and lower the whole snorkel assembly.

Figure 22:
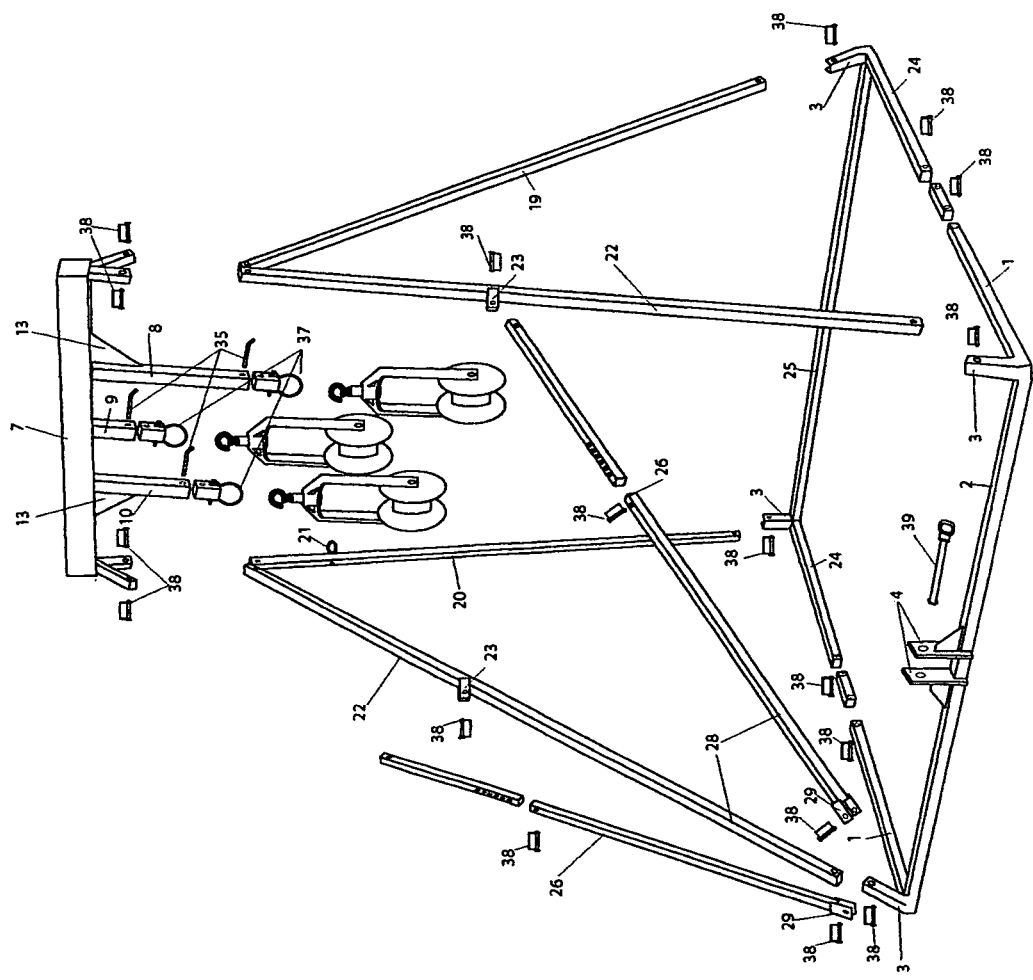
FIG. 22—is showing a angle view of the A-Frame assembly in a exploded from the other u-shaped piece with side rails 1 and front rail 2 is shown pulled apart from the other u-shaped base piece with side rails 24 and a front rail 25. The two u-shaped base pieces have a pair of connecting links 27 shown between them. The two u-shaped base pieces have a bracket 3 welded on top of each corner which upright side rails 19, 20, 22 sleeve down inside of. There is a pair of rails 22 that are shown with a pair of brackets 23 shown welded on the front of them. The brackets 23 that are welded to the front of the upright side rail 22 are the point where the brace rails 26 are attached. The brace rails 26 have brace extensions 28 that are attached to the opposite end of them. The upright side rails 19, 20 and 22 are attached to the brackets 11 attaching them to top horizontal rail.

FIG. 22—is showing a exploded angle view of the A-frame assembly. Top cross member 7 is shown with vertical square tubes 8, 9, and 10 attached to the bottom of the Top cross member 7. The pin 35 attaches to the shackle 37 to the vertical square tubes 8, 9, and 10. Pulleys are attached to the shackle 37. The Top cross member 7 is attached to the Top of upright side rails 19-22 with the pin 38. The bottom of the upright side rails 19-22 are attached to the u shaped base pieces 2 and 25 with the pin 38. The base pieces 2 and 25 are attached by the pin 38. The brace rails 26 is attached to the upright side rails 22 with the pin 38 the bracket 4 is shown welded to the base piece 2. The bracket 23 is shown welded to the upright side rail 22. The bracket 3 is shown welded to the base pieces 2 and 25.

Figure 23:
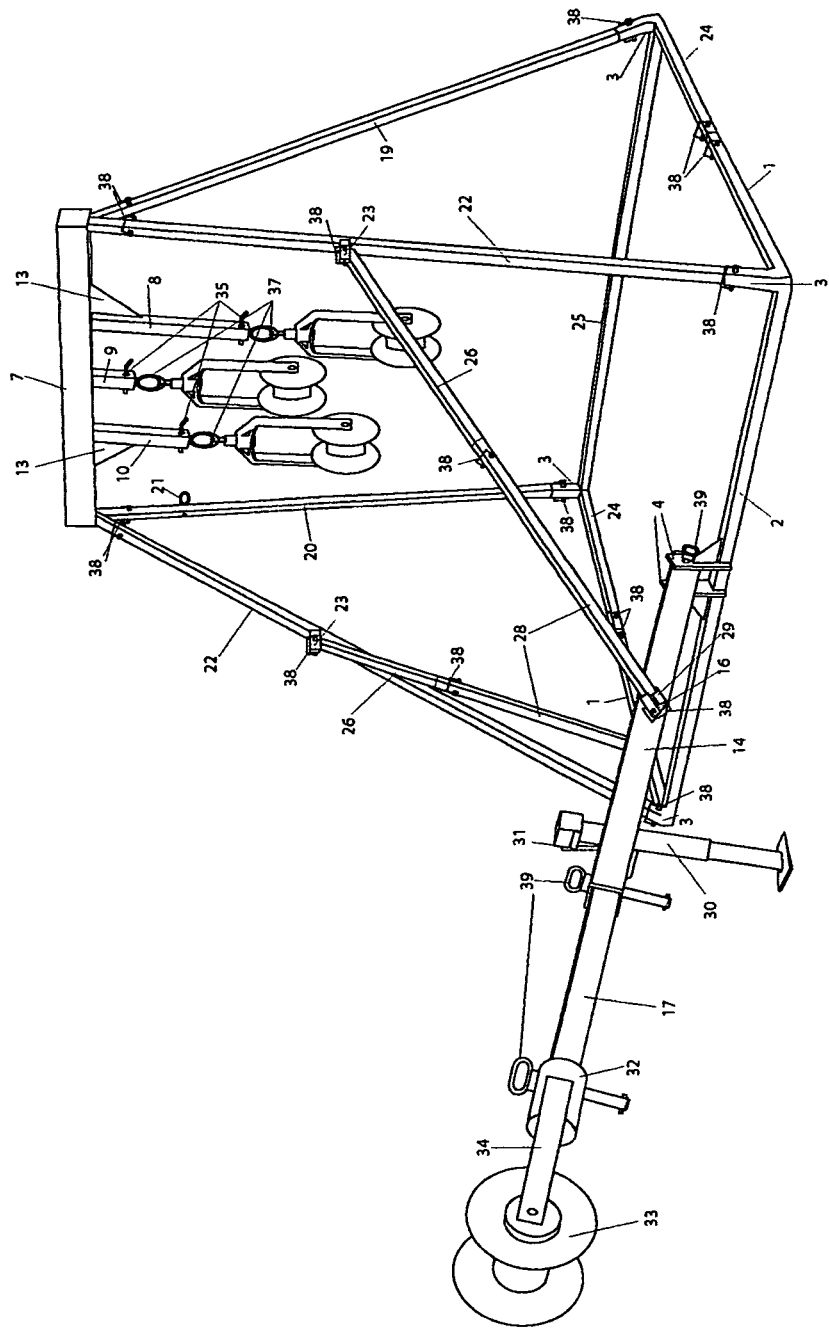
FIG. 23—is showing an angled view of the complete A-Frame Assembly with the snorkel and all pulleys attached.

FIG. 23—is showing a exploded angle view of the A-frame assembly with all pins shackles, braces, pulleys, snorkel, brace rails, base rails, upright side rails, top cross member, lift jack vertical square tubes, tip roller, attached to complete the A-Frame assembly.

What is claimed is:

1. A pulley system frame for feeding wire, said frame comprising:

a square comprising a pair of base frames; each said base frame having an elongated member with first and second longitudinal ends, and two shorter elongated members each having a first end and a second end, said first end of one of the shorter members connected to the first longitudinal end of said elongated member, and a first end of the second of the shorter members connected to the second longitudinal end of said elongated member, said second ends of said shorter members being free, said second members extending substantially parallel to each other and substantially orthogonal to said elongated member; said second ends of a first of the base frames being connected to respective second ends of a second of the base frames by a connector, and each of an intersection of the respective ends of the first elongated member with a respective second member having a protrusion extending therefrom terminating a free distal end;

first and second pairs of upright members; a first end of each of the first pair of upright members connected to one of the respective protrusions, and a second end of each the first pair of upright members connected to each other whereby a triangular shape is formed with the first pair of upright members and two of said shorter elongated members, and a first end of the second pair of upright members connected to one of the respective protrusions, and a second end of each of the second pair of upright members connected to each other whereby a triangular shape is formed with the second pair of upright members and the other two of said shorter elongated members;

a beam connecting the second ends of the first pair of upright members to the second ends of the second pair of upright members;

three bars extending from a bottom surface of the beam toward said base and terminating in respective distal ends; each respective bar being of different length;

three pulleys, each one of the respective pulleys being connected a respective distal end of one of the three bars;

a square tube having a first end hingedly connected to one of the elongated members, said square tube having a lift jack mounted thereto for raising and lowering said tube;

first and second support braces, the first support brace having a first end connected to said square tube and a second end connected to one of the first pair of upright members proximal to said tube, and the second support brace having a first end connected to said square tube and a second end connected to one of the second pair of upright members proximal to said tube; and a fourth pulley connected to a distal end of said square tube.

* * * * *